UNITED STATES PATENT OFFICE.

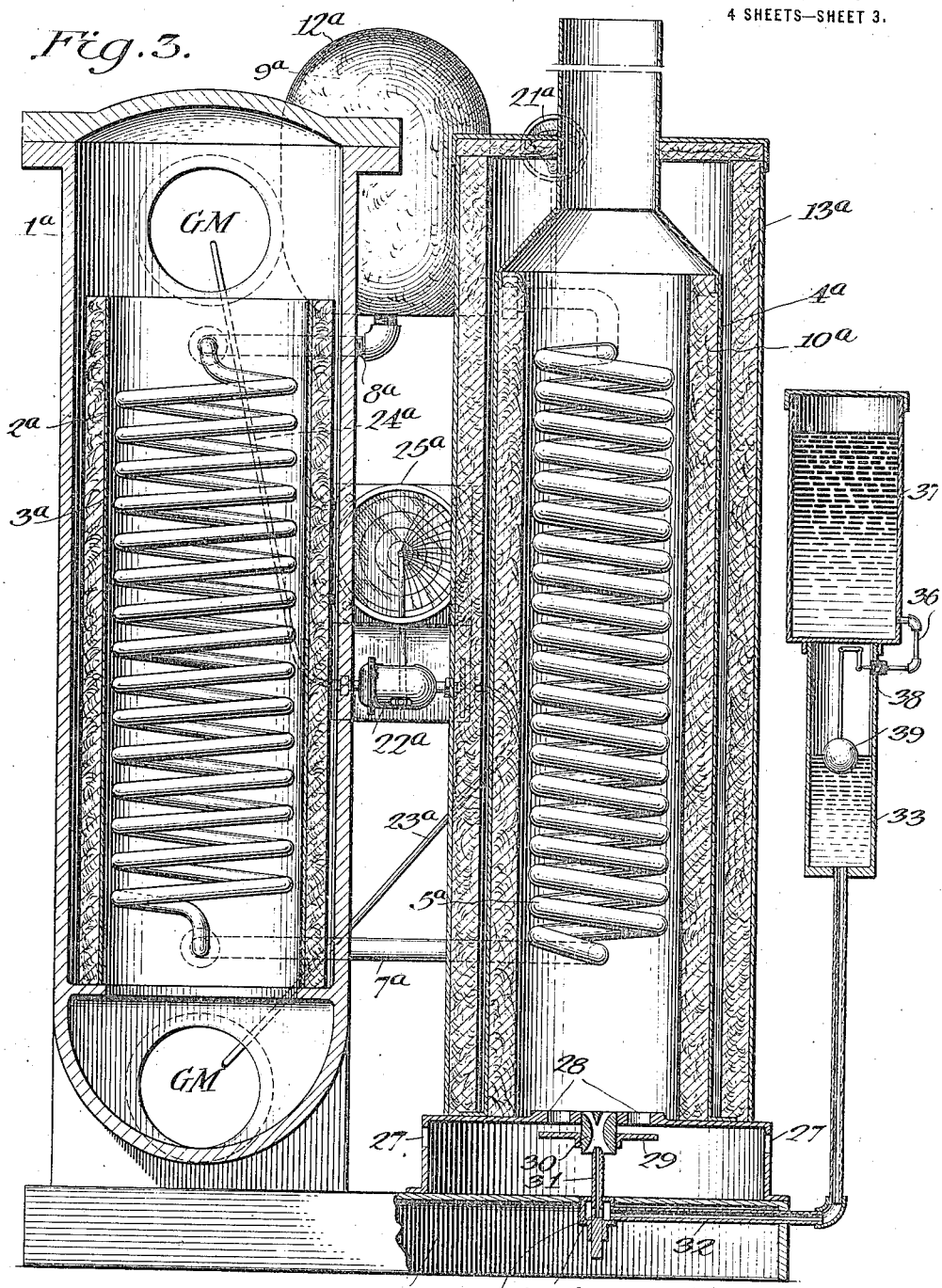

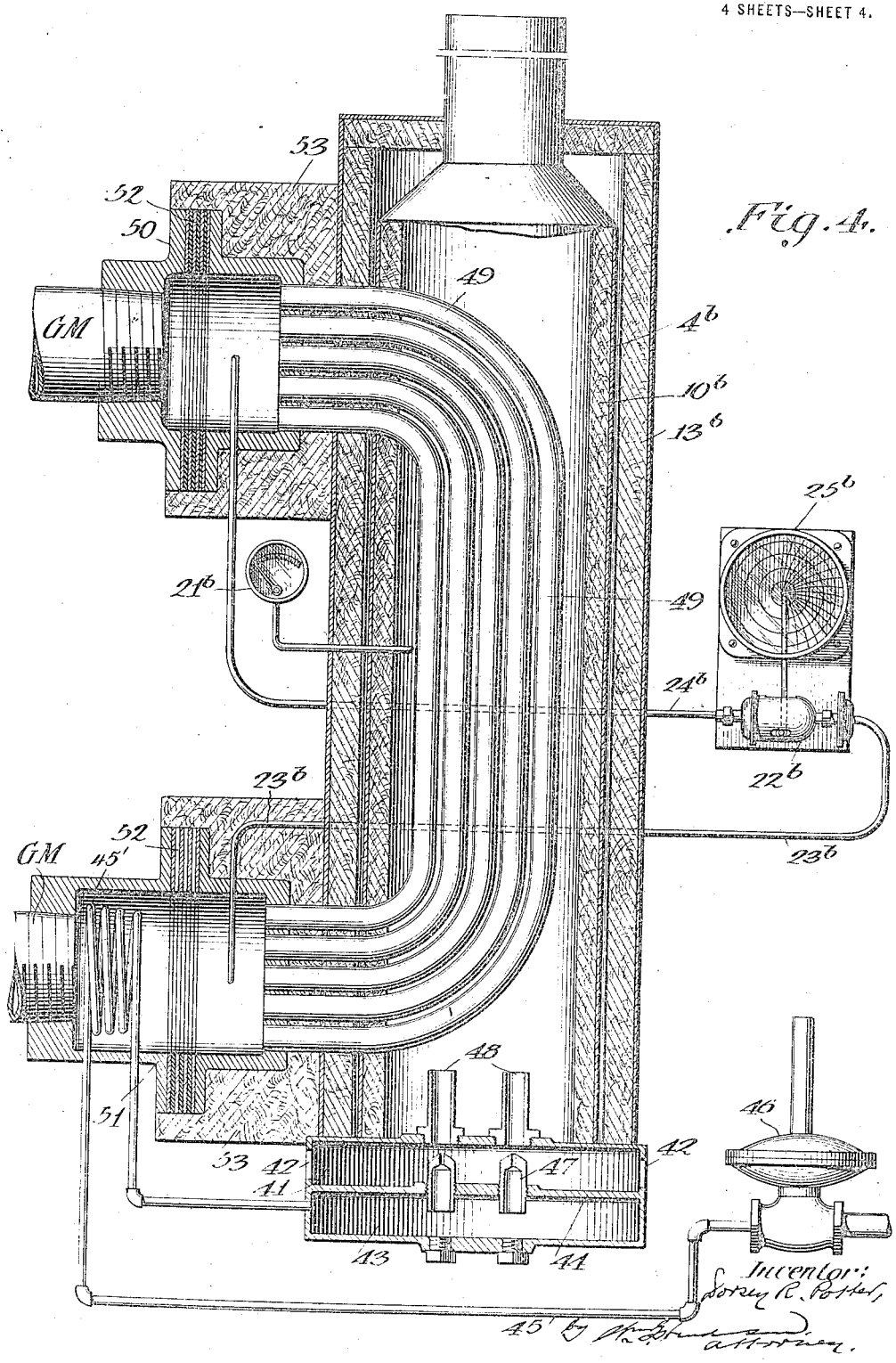

DORSEY R. POTTER, OF CLARKSBURG, WEST VIRGINIA, ASSIGNOR TO HOWELL C. COOPER, OF CLARKSBURG, WEST VIRGINIA.

METER FOR MEASURING GAS.

1,260,445.  Specification of Letters Patent.  Patented Mar. 26, 1918.

Application filed October 8, 1915. Serial No. 54,300.

*To all whom it may concern:*

Be it known that I, DORSEY R. POTTER, a citizen of the United States, residing at Clarksburg, in the county of Harrison and State of West Virginia, have invented certain new and useful Improvements in Meters for Measuring Gas; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to fluid meters.

Meters have been developed for measuring the rate of flow of fluids having means for imparting heat to the fluid and means whereby the effect of the heat transfer between the heater and the fluid may be utilized in determining the rate of flow of the fluid. Meters of this type have involved the use of electric heaters.

One of the objects of this invention is to provide a meter of the above type which may be used where electrical energy is not available for heating the fluid or where its use is not practicable.

Another object is to provide a meter in which the heating of the fluid is performed by products of combustion.

Another object is to provide a meter in which the products of combustion are obtained by burning a portion of the fluid to be measured.

Another object is to provide means for causing the products of combustion to impart heat to the fluid at a constant rate.

Other objects will appear as the specification proceeds.

Several different forms of the meter are illustrated in the accompanying drawings in which—

Fig. 3 is a vertical section of a different form of meter; and

Fig. 4 is a vertical section of another form of meter.

Figure 1:
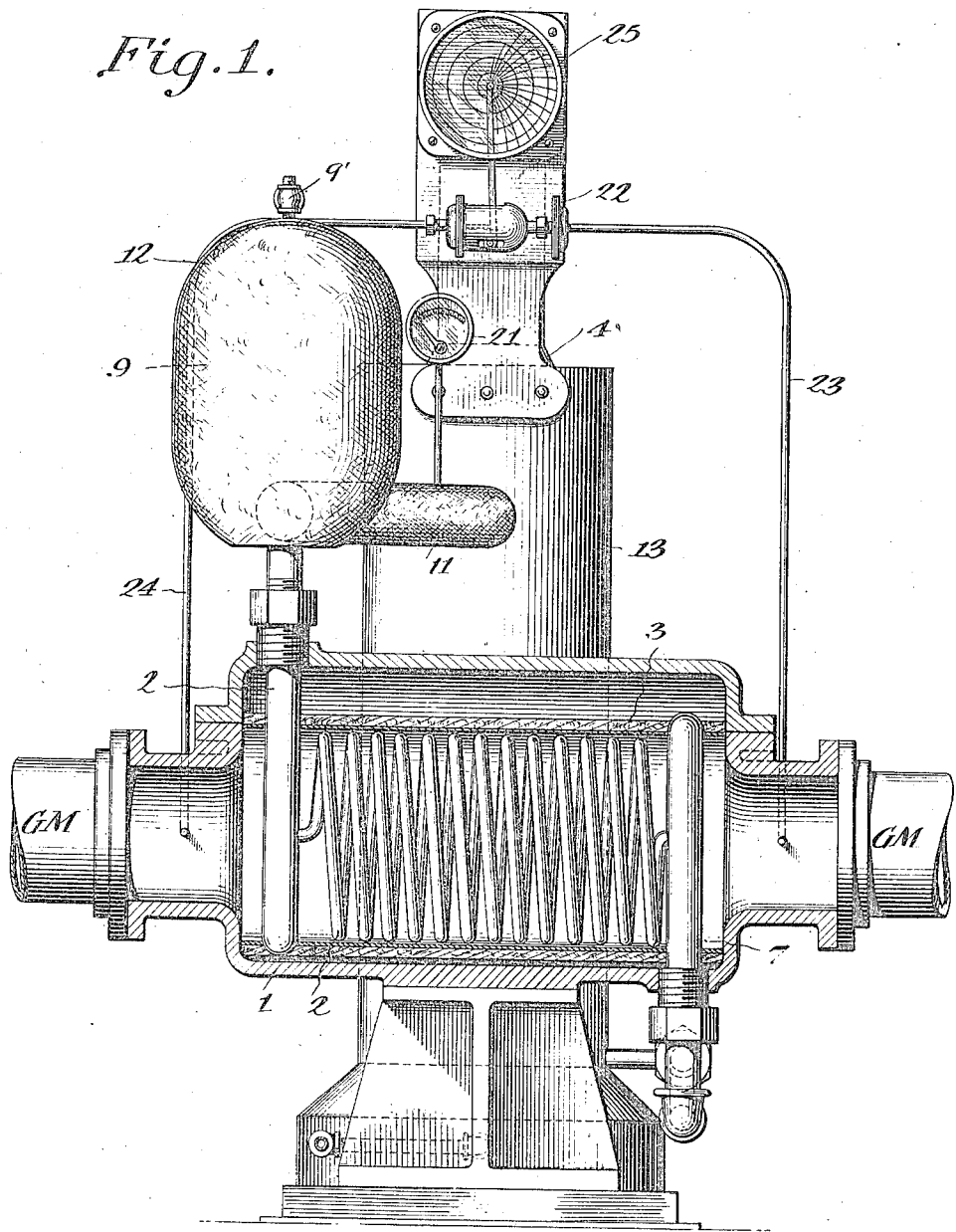
Figure 1 is a side elevation of one form of meter, certain parts being shown in section.
Figure 2:
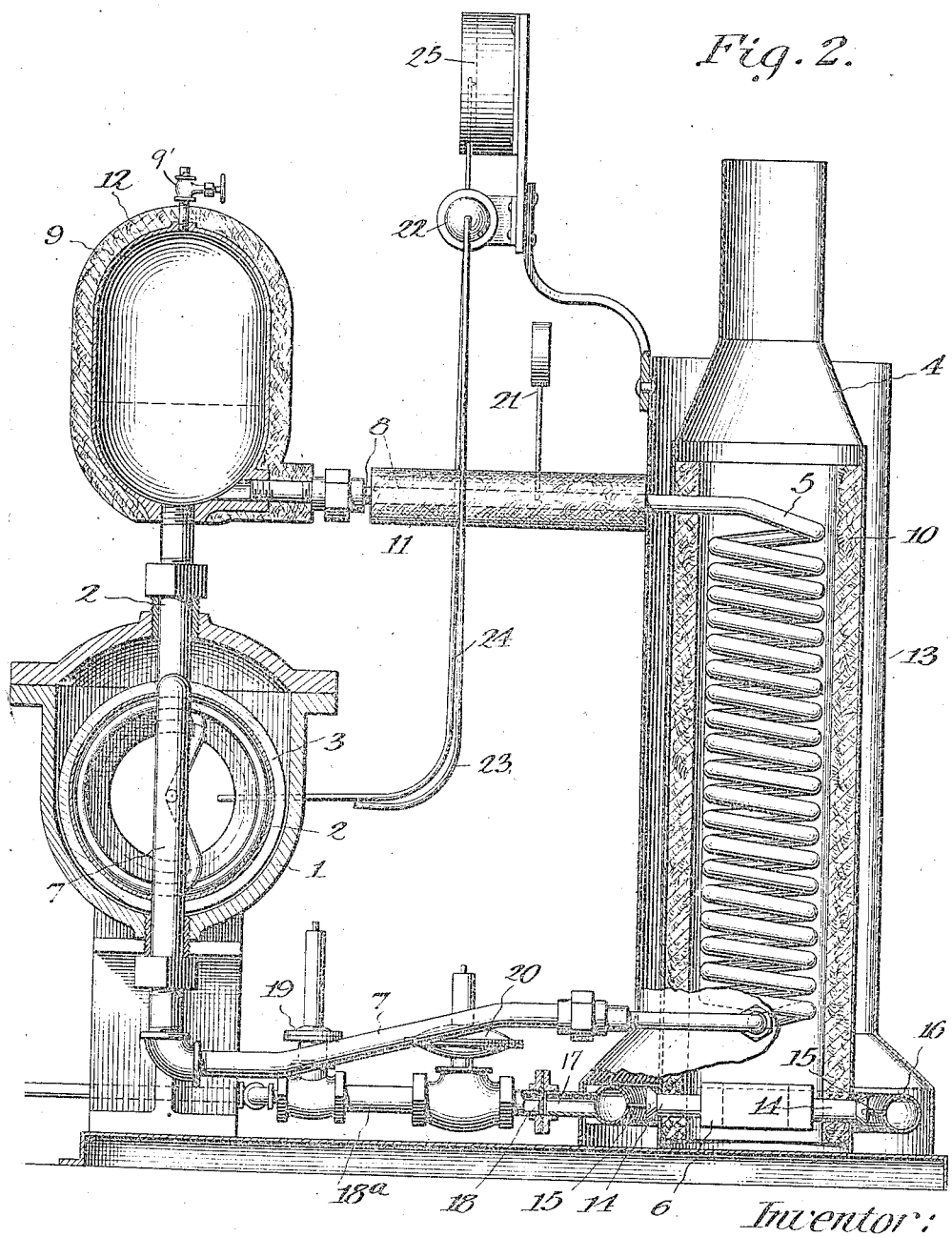
Fig. 2 is a vertical transverse section of the meter shown in Fig. 1.

A meter constructed in accordance with the present invention may take various different forms. Several different forms of the meter are illustrated herein for exemplary purposes and these will be specifically described.

In the drawings the numeral 1 r-presents a casing or chamber through which the gas will flow from the gas main. Within the casing or chamber is located a suitable heater, for instance a coil 2 for the passage of a suitable heating agent, as for instance heated water or other agent so that gas flowing through the casing in contact with the heating coil will have heat transferred to it from the heating agent passing through the coil. The coil may be inclosed within an insulating jacket 3 open at both ends to the gas main G M and protecting the contained heater against the influences of external temperatures. The coil 2 is connected at opposite ends to a suitable heat generator which may consist of a casing 4 containing a coil 5 for flow of the heat transmitting liquid or agent and a burner 6 for generating the heat. The coil 5 is connected at one end by a pipe 7 with one end of the heating coil and at the other end by a pipe 8 with an expansion chamber 9 with which the other end of the coil 2 connects so that there will be a circulation of the heating agent from the heat generating chamber to the heat transmitting coil in the casing 1. The heat generating chamber has its wall provided with a suitable insulating protector 10, the pipe 8 with an insulating covering 11, and the expansion chamber is provided with an insulating covering 12. The heat generating chamber is provided with a jacket 13 for supply of air to the burner through the space between the jacket and heat generating chamber. The burner 6 is preferably of the gas type and provided at opposite ends with funnel-shaped inlets 14 to receive air supplied through the jacket 13 and gas from the jet-pipes 15 projecting from the pipe 16. The pipe 16 encircles the lower part of the heat generating chamber within the jacket 13 and is supplied with gas through a pipe 17 having a restricted opening 18 which may or may not be provided with a controlling valve. The pipe 17 receives its supply by a pipe 18ª which may lead from the gas main G M and is provided with pressure regulators 19 and 20 of any well known type of construction for controlling the pressure of gas supplied to the burner so as to maintain a fixed pressure of gas at the receiving side of the restricted opening 18. Thus the amount of fuel gas which passes to the burner per unit of time will remain at all times a fixed quantity and consequently the volume and intensity of heat developed by the burner will be constant.

A thermometer 21 of any suitable type is connected with the pipe leading from the heat generating coil to the expansion chamber, or other part of the system, to indicate the temperature of the heat circulating medium. A differential thermometer 22 of any suitable well known type is connected by temperature tubes 23 and 24 with the gas main at opposite ends of the heating coil 2 and is provided with a suitable recording chart 25 rotated at a regular speed by any suitable clock or other mechanism. The chart 25 is suitably marked as shown in the drawing by circular divisions representing the number of feet of gas passing per day, or per minute of time, and radial minute divisions so as to indicate the flow in standard cubic feet per unit of time by the difference in temperature in flowing gas at the points where it enters and where it leaves the casing or chamber containing the heating coil. As differential thermometers of the type mentioned are well known and the invention does not lie in its special construction, such a thermometer is illustrated only in a diagrammatic way. Two ordinary recording thermometers may be used, one on the inlet and one on the outlet if desired, instead of the differential thermometer. The charts from the two instruments must be compared at intervals so as to find the difference in temperature of the incoming and outgoing gas.

Under the form of the invention so far described the operation is as follows: The coils 2 and 5, and expansion tank 9 up to the level indicated by the dotted line, are filled with the heat transmitting fluid. The burner to the heat generating chamber is lighted and in proper time a fixed volume of hot gases or substances passes up and around the heating coil 5 and heats the fluid therein and in due time a circulation of the heated fluid takes place between the coils 5 and 2, causing a transfer of heat from the coil 2 to the gas flowing from the gas main through the heating casing or chamber, 1. The supply of fuel gas to the burner of the heat generating chamber is regulated so as to maintain a fixed temperature in the chamber and the extent of heating surface of the coil 2 is a constant quantity, therefore if, for instance, 1000 standard cubic feet of gas pass through the casing or chamber 1 in one minute of time, the temperature of the gas will be raised a certain amount by the heat transmitted from the coil 2 and the rise in temperature will be indicated by the differential thermometer. So long therefore as heat is added or maintained at a uniform rate to the heating fluid then as long as gas passes over the heating coil 2 at the uniform rate of 1000 standard cubic feet per minute a certain fixed quantity of heat will be absorbed by the gas passing over the coil 2 and its temperature raised a fixed amount. When therefore the differential thermometer records that rise in temperature, it follows that 1000 standard cubic feet are passing per minute. Thus by continuing to operate the meter with the same rate of heat absorption it follows that for each rate of flow for the gas to be measured there will be a corresponding temperature rise recorded by the differential thermometer; thus will occur a large rise for a small flow and a small rise for a large flow of gas. The quantity of heat which will pass through a metal plate in a unit of time varies with the difference of temperature on the two sides of the plate, and for this reason the temperature of the incoming gas is recorded, because since the temperature in the heating chamber is constant, the rate of transfer of heat into the gas to be measured will vary slightly for the same quantity of gas undergoing measurement should the temperature of the gas entering the instrument vary. By recording this temperature the volume record can be modified accordingly.

In Fig. 3 of the drawing there is illustrated a form of meter, in which oil instead of gas is used as the heat generating agent. In this form of the invention the casing or chamber $1^a$ which is connected at opposite ends with the gas main is illustrated as in an upright position and contains the heating coil $2^a$ through which the heating medium flows, said coil preferably being located within the insulated jacket $3^a$ open at opposite ends for the passage of the gas flowing through the gas main. The coil $2^a$ is connected at one end by a pipe $7^a$ with the lower end of a coil $5^a$ in the heat generating chamber and at the other end through an expansion tank $9^a$ and a pipe $8^a$ with the upper end of the coil $5^a$. The coil $5^a$ is contained within a casing $4^a$ having an insulating protector $10^a$ and inclosed within a jacket $13^a$ which may have an insulating protector as illustrated. The casing and jacket are illustrated as resting upon a hollow base 26 provided with ports 27 for the admission of air to promote combustion. The top plate of the base is provided with ports 28 opening into the combustion chamber portion of the casing $4^a$. These parts are controlled or regulated by a suitable cap or cover 29 encircling a mixer nozzle 30 depending from the top plate and operated by any suitable means for regulating the volume of air passing from the hollow base through ports 28 into the combustion chamber. A nozzle 31 receiving oil, as fuel, through a pipe 32 from a reservoir 33 supplies the fuel oil to the mixing nozzle 30, which receives air from the hollow base 26. The oil nozzle 31 has side ports 34 positioned within a chamber 35 at the end of pipe 32, and is adjustable by any suitable means so as to regulate the flow of oil through the nozzle to the mixer. The reservoir 33 is connected by a pipe 36 with an oil storage tank 37 and the pipe 36 is provided with a valve 38 controlled by a float 39 so as to hold an approximately uniform level of oil in the reservoir for the purpose of obtaining a fixed head or pressure of oil at the nozzle burner so as to maintain a constant flame temperature and degree of heat in the generating chamber or casing $4^a$. A thermometer $21^a$ of a suitable type connects with the pipe $8^a$ leading from the coil $5^a$ to indicate the temperature of the heat transmitting medium; and a differential thermometer $22^a$ having a recording chart $25^a$ connects by temperature tubes $23^a$ and $24^a$ with the gas main at opposite ends of the heating coil $2^a$ so as to indicate the difference in temperature in the flowing gas at the points where it enters and where it leaves the case or chamber containing the coil $2^a$. The operation of the form of the meter just described is practically the same as the form of the invention first described, the difference being in the employment of an oil fuel for the heat generating chamber instead of a gas burner as in the first form.

Another form of the invention contemplates the application of the products of combustion directly to the conduit through which the gas to be heated is passed or caused to flow instead of transmitting the heat to the gas from a heated medium passing through a suitable conduit as in the first two forms of the invention described. In this third form of the invention the heat producing agent or fuel may be either gas or oil or other heat generating agent. For purposes of illustration I have selected gas as the fuel. This form of the invention is illustrated in Fig. 4 of the drawing. In this figure $4^b$ indicates the casing of a heat generating chamber having an insulating protection $10^b$ and inclosed in a jacket $13^b$ having an insulating protector. The base of the generating chamber is hollow to form an air chamber 41 having air inlet ports 42. Beneath the air chamber 41 is a fuel gas chamber 43 separated by a partition 44 from the air chamber and receiving a supply of gas through a pipe 45 which may lead from the gas main and provided with a pressure regulator 46 of any approved type for insuring a regulated flow of gas, under a constant pressure to the gas burner. The partition 44 is provided with nipples 47 for the passage of gas to a point beneath the mixer tubes 48 leading from the air chamber 41 into the lower portion of the combustion chamber of the heat generating casing $4^b$, air being entrained by the gas jets so as to form a proper combustible mixture in the combustion chamber of the casing $4^b$. The conduit for the gas to be measured consists of a number of pipes or tubes 49 communicating at opposite ends with headers or manifolds 50 and 51 which establish communication between the opposite ends of the conduits and the gas main through which the gas flows. The main body of the conduit tubes lies within the heat generating chamber or casing $4^b$ so that the gas flowing through the tubes will have heat imparted thereto by the heat of combustion generated within and passing through the casing $4^b$ and thus the temperature of the flowing gas will be raised so that its rise in temperature may be recorded by the differential thermometer and the volume or quantity of gas flowing per minute through the gas main may be ascertained and recorded. At the junction of the two parts or sections of each of the manifolds (50 and 51) there are placed thin plates 52, with gaskets between them, to form insulations between the sections so as to prevent the metal composing the manifolds from conducting heat from the tubes 49 to the gas main. An insulating covering 53 of suitable material is also preferably placed around the protruding ends of the tubes 49 and the manifolds 50 and 51 as illustrated to prevent the radiation of heat from such parts which would vary with the external temperature.

A portion of the fuel supply pipe 45 in the form of a coil as illustrated, lies within the inlet or manifold 51 of the gas main so that the fuel gas after being regulated by the pressure regulator 46 is subjected or exposed through the coil in the manifold 51 to the current of gas flowing into the instrument. Thus the fuel gas is brought to substantially the same temperature at all times, as that of the incoming gas from the main thus insuring accuracy of the meter. The differential thermometer $22^b$ having a recording chart $25^b$ and of any well known type of construction is connected by temperature tubes $23^b$ and $24^b$ with the headers or manifolds 50 and 51, respectively so as to indicate the difference in temperature of the gas flowing through the gas main at the points where it enters and where it leaves the conduits of the heating chamber; and a thermometer $21^b$ may be used to indicate the temperature of the heating gases or products of combustion in the heat generating chamber.

In all of the forms of meters herein disclosed, the heating of the fluid to be measured is accomplished by the use of products of combustion and therefore the meter is capable of being used where electric energy is not available or where its use is not practicable. When the fluid to be measured is combustible gas, the fuel for generating the products of combustion may be taken directly from the fluid to be measured. The different forms of the meter herein disclosed are merely illustrative, and the meter may, therefore, take various other forms without departing from the spirit or scope of the invention as defined in the accompanying claims.

What I claim is:

1. A fluid meter comprising a conduit adapted to be connected to a fluid main through which flows the fluid whose rate of flow is to be measured, means to heat said fluid comprising means for generating products of combustion, and means to measure the effect of the heat transfer between the products of combustion and the fluid.

2. A fluid meter comprising a conduit adapted to be connected to a fluid main through which flows the fluid whose rate of flow is to be measured, means to heat said fluid comprising means for generating products of combustion, and means to measure the rise in temperature produced in the fluid by the products of combustion.

3. A fluid meter comprising a conduit adapted to be connected to a fluid main through which flows the fluid whose rate of flow is to be measured, means to heat said fluid comprising means for generating products of combustion, and temperature indicating means responsive to the temperature of the fluid before and after being heated by the products of combustion.

4. In a fluid meter a conduit adapted to be connected to a fluid main through which flows the fluid whose rate of flow is to be measured, means to heat the fluid comprising at least one fluid burner and means whereby the effect of the heat transfer between said means and the fluid may be utilized in determining the rate of flow of the fluid.

5. In a fluid meter a conduit adapted to be connected to a fluid main through which flows the fluid whose rate of flow is to be measured, means to heat the fluid comprising at least one fluid burner, means to supply fluid to said burner at a constant rate, and means whereby the effect of the heat transfer between the heating means and the fluid may be utilized in determining the rate of flow of the fluid.

6. In a fluid meter a conduit through which the fluid to be measured flows, means to heat said fluid comprising at least one fluid burner, means to supply said burner with fluid taken from the fluid to be measured, and means whereby the effect of the heat transfer between the heating means and the fluid may be utilized in determining the rate of flow of the fluid.

7. A fluid meter comprising a conduit adapted to be connected to a fluid main through which flows the fluid whose rate of flow is to be measured, means to heat said fluid comprising means for generating products of combustion, and a differential expansion thermometer responsive to the difference in the temperature in the fluid before and after being heated by the products of combustion.

8. A fluid meter comprising a conduit adapted to be connected to a fluid main through which flows the fluid whose rate of flow is to be measured, means comprising a fluid burner to supply heat at a constant rate to the fluid and means to measure the temperature rise of the fluid.

9. A fluid meter comprising a conduit through which the fluid to be measured flows, means to heat said fluid comprising at least one fluid burner, means to pre-heat the fuel supplied to said burner, and means whereby the effect of the heat transfer between the heating means and the fluid may be utilized in determining the rate of flow of the fluid.

10. A fluid meter comprising a conduit through which the fluid to be measured flows, means to heat said fluid comprising at least one fluid burner, means to pre-heat the fuel supplied to said burner, and means whereby the effect of the heat transfer between the heating means and the fluid my be utilized in determining the rate of flow of the fluid.

11. A fluid meter comprising a conduit through which the fluid to be measured flows, means to heat said fluid comprising at least one burner, means to bring the temperature of the fuel supplied to said burner to substantially the same temperature as the temperature of the fluid to be measured, and means whereby the effect of the heat transfer between the heating means and the fluid may be utilized in determining the rate of flow of the fluid.

12. A fluid meter comprising a 'conduit through which the fluid to be measured flows, a heating coil positioned in said conduit, a second coil connected with said first named coil so that a liquid heating medium may circulate through both of said coils, means to impart heat to the liquid as it passes through said second named coil, and means to utilize the effect of the heat transfer between said first named coil and the fluid in determining the rate of flow of the fluid.

13. A fluid meter comprising a conduit through which the fluid to be measured flows, a heating coil positioned in said conduit, a second coil connected with said first named coil so that a fluid heating medium may circulate through both of said coils, at least one fluid burner for heating the fluid medium as it passes through said second named coil, and means to utilize the effect of the heat transfer between said first named coil and the fluid in determining the rate of flow of the fluid.

14. The method of determining the rate of flow of a fluid which consists in imparting heat to the fluid by means of products of combustion and utilizing the effect of the heat transfer between the products of combustion and the fluid in determining the rate of flow of the fluid.

15. The method of determining the rate of flow of a fluid which consists in imparting heat to the fluid by means of products of combustion, and utilizing the temperature effect on the fluid in determining the rate of flow of the fluid.

16. The method of determining the rate of flow of a fluid which consists in imparting heat to the fluid at a constant rate by means of products of combustion, and utilizing the temperature effect on the fluid in determining the rate of flow of the fluid.

17. The method of determining the rate of flow of a fluid which consists in imparting heat to the fluid by means of a heated liquid, heating said liquid by means of products of combustion and utilizing the effect of the heat transfer between the fluid and said heated liquid in determining the rate of flow of the fluid.

18. The method of determining the rate of flow of a fluid which consists in heating the fluid by means of a heated liquid, supplying heat at a constant rate to the heated liquid by means of products of combustion, and utilizing the effect of the heat transfer between the fluid and the heated liquid in determining the rate of flow of the fluid.

19. The method of determining the rate of flow of a fluid which consists in imparting heat to the fluid from a source of heat, supplying fluid fuel to said source of heat, bringing the fluid fuel before it reaches said source to substantially the same temperature as the fluid to be measured.

20. The method of determining the rate of flow of a fluid which consists in imparting heat to the fluid from a source of heat, supplying fluid fuel to said source of heat, subjecting said fuel before it reaches said source to the temperature of the fluid to be measured.

21. The method of determining the rate of flow of a fluid which consists in utilizing a portion of the fluid to be measured to supply heat energy to produce a measurable temperature effect on the fluid.

22. The method of determining the rate of flow of a fluid which consists in imparting heat to the fluid to be measured by means of a heated liquid, imparting heat to said liquid, and utilizing the temperature effect on the fluid of the heat imparted thereto by the liquid in determining the rate of flow of the liquid.

23. The method of determining the rate of flow of a fluid which consists in imparting heat to the fluid by means of a heated liquid, heating said liquid by means of products of combustion and utilizing the effect of the heat transfer between the fluid and said liquid in determining the rate of flow of the fluid.

24. A fluid meter comprising a conduit through which the fluid to be measured flows, means to heat said fluid comprising means for generating products of combustion, and means whereby the effect of the heat transfer between the products of combustion and the fluid may be utilized in determining the rate of flow of the fluid.

25. The method of determining the rate of flow of a fluid which consists in imparting heat to the fluid by means of products of combustion and utilizing the effect of the heat transfer in determining the rate of flow of the fluid.

In testimony whereof I affix my signature in presence of two witnesses.

DORSEY R. POTTER.

Witnesses.
J. M. BURR,
OSIE STURM.

Copies of this patent may be obtained for five cents each, by addressing the "Commissioner of Patents, Washington, D. C."